US006790317B2

(12) United States Patent
Antal, Jr.

(10) Patent No.: US 6,790,317 B2
(45) Date of Patent: Sep. 14, 2004

(54) PROCESS FOR FLASH CARBONIZATION OF BIOMASS

(75) Inventor: Michael J. Antal, Jr., Honolulu, HI (US)

(73) Assignee: University of Hawaii, Honolulu, HI (US)

(*) Notice: Subject to any disclaimer, the term of this patent is extended or adjusted under 35 U.S.C. 154(b) by 149 days.

(21) Appl. No.: 10/152,276

(22) Filed: May 20, 2002

(65) Prior Publication Data

US 2003/0024165 A1 Feb. 6, 2003

Related U.S. Application Data

(60) Provisional application No. 60/302,100, filed on Jun. 28, 2001.

(51) Int. Cl.[7] .......................... C10B 53/00; C10B 57/00; C10B 57/04; C10L 5/40
(52) U.S. Cl. .............................. 201/35; 201/21; 201/25; 201/35; 44/589; 44/590; 44/543
(58) Field of Search ............................. 201/35, 21, 25, 201/1; 44/589, 590, 543; 110/235, 341, 346

(56) References Cited

U.S. PATENT DOCUMENTS

| 4,530,702 A | 7/1985 | Fetters et al. |
| 5,435,983 A | 7/1995 | Antal, Jr. ................. 423/445 R |
| 5,551,958 A | 9/1996 | Antal, Jr. ..................... 44/629 |

OTHER PUBLICATIONS

Antal, M. J.; Varhegyl. G. Cellulose Pyrolysis Kinetics: The Current State of Knowledge. Ind. Eng. Chem. Res. 1995. 34. 703.

Antal. M. J., Jr.; Varhegyi, G.; Jakab. E. Cellulose Pyrolysis Kinetics: Revisited. Ind. Eng. Chem. Res. 1998. 37. 1267.

Smith. K. R.; Pennise, D. M.; Khummongkol. P.; Chaiwong. V.: Ritgeen. K.: Zhang. J.: Panyathanya. W.: Rasmussen. R. A.: Khalil. M. A. K.; Greenhouse Gases from Small–Scale Combustion Devices in Developing Countries: Charcoal–Making Kilns in Thailand. EPA–600 R–99–109. Office of Air and Radiation and Policy and Program Evaluation Div.: Washington. DC. 1999.

Antal. M. J.; Allen, S. G.; Dai. X.: Shimizu. B.: Tam, M. S.: Gronli, M. G. Attainment of the theoretical yield of carbon from biomass. Ind. Eng. Chem. Res. 2000. 39. 4024.

Antal. M. J.; Croisel. E.; Dai. X. F.: DeAlmeida. C.; Mok. W. S. L.; Norberg, N.: Richard. J. R.; Majthoub, M. A. High–Yield Biomass Charcoal. Energy Fuels 1996. 10. 652.

Primary Examiner—Jerry Johnson
Assistant Examiner—Alexa A. Doroshenk
(74) Attorney, Agent, or Firm—Beyer Weaver & Thomas LLP

(57) ABSTRACT

A low-energy input process for the pyrolytic conversion of biomass to charcoal or carbonized charcoal is provided. The biomass is sealed in a container, pressurized with air and heated to ignition. Control of pressure by input of air and release of gases to maintain successively lower pressure levels results in a typical time for the conversion of less than 30 minutes.

21 Claims, 1 Drawing Sheet

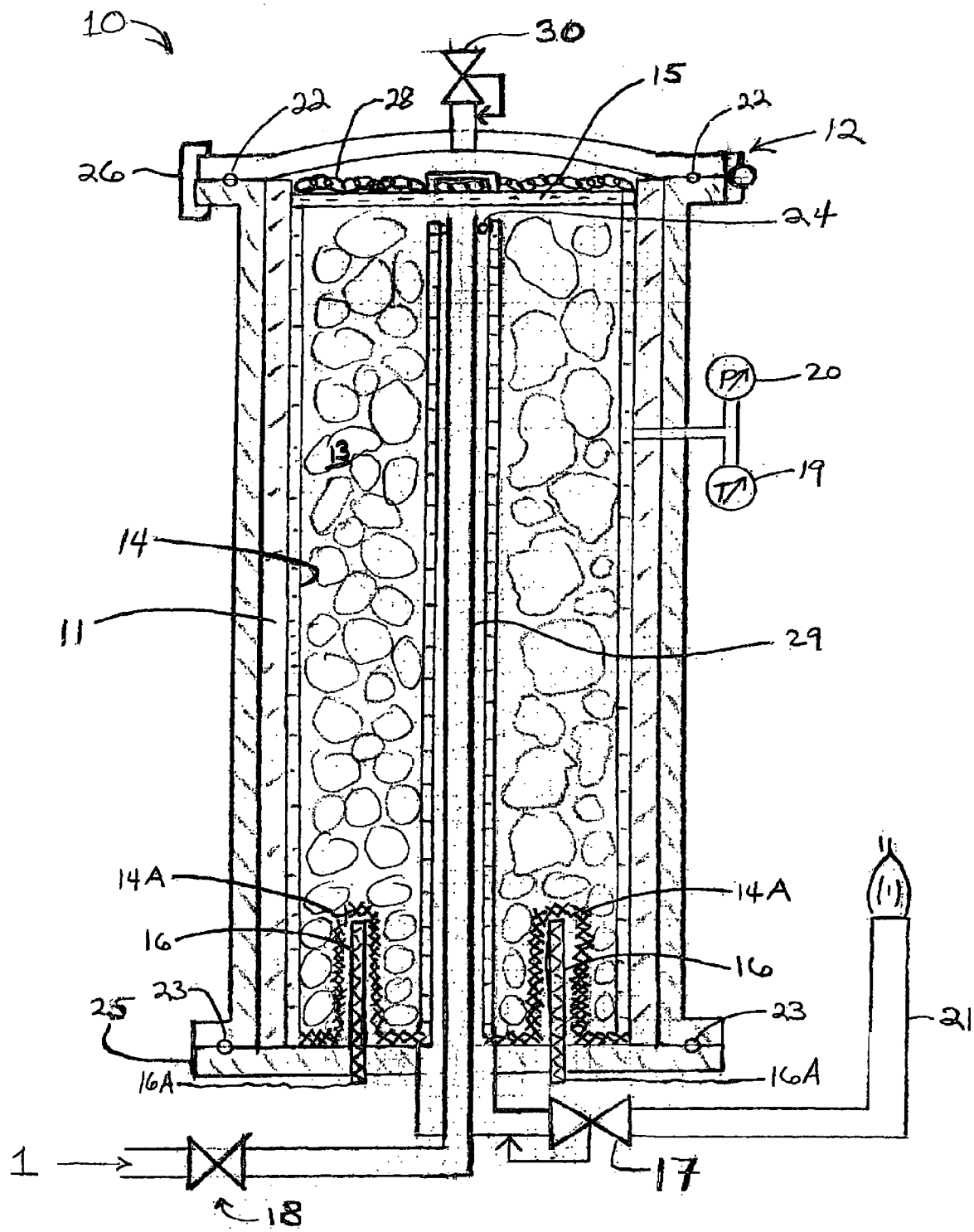

PROCESS FOR FLASH CARBONIZATION OF BIOMASS

RELATED APPLICATION

This application claims priority of provisional Application No. 60/302,100, filed Jun. 28, 2001, which is incorporated herein by reference.

FIELD OF THE INVENTION

This invention relates to the production of charcoal from biomass.

BACKGROUND OF THE INVENTION

The term "biomass" includes all sorts of woody and herbaceous plant material, such as wood logs, slabs, chips, and bark; and agricultural residues such as corncobs, corn stover, wheat straw, nutshells, and sugar cane bagasse. Biomass may also include the organic fraction of municipal solid wastes, sewage sludge, manure, or other excrement, and the residues of animal husbandry, such as bones and carcasses. The term "inert" in the context of the present invention means that such compound, composition or material does not react with biomass, or its byproducts of pyrolysis, at temperatures and pressures attained within the reaction container in the practice of the present invention.

Charcoal is a carbonaceous solid with a fixed-carbon content of 70 wt % or more. Charcoal is usually manufactured from hardwoods by pyrolysis in large kilns or retorts at temperatures below about 500° C. When charcoal is heated ("carbonized") in an inert environment to temperatures typically above 80° C., it loses most of its remaining volatile matter and becomes a nearly pure carbon (see Table 1) with a fixed-carbon content of 90 wt % or more. As used herein, the term "biocarbon" represents both charcoal and carbonized charcoal. Biocarbons possess many unique properties. Both charcoal and carbonized charcoal contain virtually no sulfur (see Table 1) or mercury. Relative to their fossil fuel cousins, these biocarbons are very low in nitrogen and low in ash. Consequently, many carbonized charcoals are purer forms of carbon than most graphites. Unlike coking coals, pitches, crude resids, and other fossil carbon precursors, biocarbons do not pass through a liquid phase during pyrolysis at low heating rates. Ref. 1 and 2. Consequently, biocarbons are inherently porous. They are also amorphous, as evidenced by very little of a turbostratic structure in their x-ray diffraction spectra. Nevertheless, a packed bed of carbonized charcoal conducts electricity nearly as well as a packed bed of graphite particles.

The charcoal yield $y_{char}$ is defined as $y_{char}=m_{char}/m_{bio}$, where $m_{char}$ the dry mass of product charcoal and $m_{bio}$ is the dry mass of the biomass feedstock. Unfortunately, this representation of the efficiency of biomass carbonization is intrinsically vague because the chemical composition of charcoal is not defined. A more meaningful measure of the carbonization efficiency is given by the fixed-carbon yield $y_{fC}=Y_{char}*\{\% \text{ fC}/(100-\% \text{ feed ash})\}$, where % fC is the percentage fixed-carbon content of the charcoal, and % feed ash is the percentage ash content of the feed. This yield represents the efficiency realized by the pyrolytic conversion of ash-free organic matter in the feestock into a relatively pure, ash-free carbon.

A typical yield of charcoal manufactured from hardwoods in a Missouri kiln operated on a 7 to 12 day cycle is about 28 wt % (on a dry basis). This charcoal has a fixed-carbon content of about 70 wt %; therefore the process offers a fixed-carbon yield of about 20 wt % ($0.28*0.7$). Less efficient processes are widely employed in the developing world. Ref. 3. Such processes are among the principal causes of the deforestation of many tropical countries. Thermochemical equilibrium calculations indicate that a fixed-carbon yield of about 30 wt % should be achieved when equilibrium is reached in a pyrolytic reactor operating at 4° C. Ref. 4.

In a prior, commonly assigned patent, it is disclosed that high yields are obtained when pyrolysis is conducted at elevated pressure in a closed reactor vessel wherein the hot vapors are held captive and in contact with the hot solid products of pyrolysis. See U.S. Pat. Nos. 5,435,983 and 5,551,958. Charcoal yields were obtained of 42 to 62 wt % with fixed-carbon contents of 70 wt % or higher on a 1 hour operating cycle. Ref. 4 and 5. Also, various agricultural wastes (e.g., kukui nut shells, macadamia nut shells, and pecan shells) and tropical species (e.g., Eucalyptus, leucaena, and bamboo) offered higher yields of carbon than the hardwoods traditionally employed by industry in the USA and Europe. Moreover, the yields of carbon from oat and rice hulls, and sunflower shells were nearly as high as the yields of carbon from hardwoods. Table 2 displays an estimate of the biocarbon production potential of agricultural residues in the USA based on processing of biomass according to U.S. Pat. No. 5,435,983. Over 200 million tons of fixed carbon can be produced annually from the agricultural residue resource. It is estimated that wood residues generated by the forestry industry could be used to produce about 250 million tons of fixed carbon per year. For comparison, about 990 million tons of coal were produced in the USA in 1999.

TABLE 1

Ultimate analyses of representative charcoals and carbonized charcoals.

| Feed | C (wt %) | H (wt %) | O (wt %) | N (wt %) | S (wt %) | ash (wt %) |
|---|---|---|---|---|---|---|
| Eucalyptus wood charcoal | 80.30 | 3.84 | 13.82 | 0.31 | <0.01 | 1.74 |
| Macadamia nut shell charcoal | 74.58 | 4.08 | 19.95 | 0.56 | <0.01 | 0.83 |
| Macadamia nut shell carbon | 94.58 | 0.97 | 2.93 | 0.47 | 0.03 | 1.04 |
| Oak wood carbon | 92.84 | 1.09 | 3.49 | 0.24 | 0.04 | 1.46 |
| Pine wood carbon | 94.58 | 1.06 | 3.09 | 0.11 | 0.04 | 0.69 |

TABLE 2

Biocarbon production potential from agricultural residues in the USA.

| Crop | Products | Production (10⁶ t/yr, moist) | Fixed-C Yield of Ash Free Biomass | Fixed-C Production (10⁶ t/yr) | Energy Potential (10¹⁵ J/yr) |
| --- | --- | --- | --- | --- | --- |
| Corn (USA) | Cobs | 250 | 0.22 | 27 | 890 |
|  | Stover | 410 | 0.27 | 93 | 3,100 |
| Corn (10 states)[a] | Stover | 140 | 0.27 | 31 | 1,000 |
| Wheat & Rye | Hull | 40 | 0.26 | 8.6 | 280 |
|  | Straw | 110 | 0.29 | 27 | 890 |
| Soybeans | Hull | 5.2 | 0.26 | 1.1 | 37 |
|  | Stalk & Straw | 120 | 0.27 | 26 | 850 |
| Cotton | Waste | 19 | 0.32 | 5.7 | 190 |
| Oats & Barley | Hull | 5.9 | 0.26 | 1.4 | 47 |
|  | Straw | 17 | 0.29 | 4.5 | 150 |
| Sorghum | Residue | 14 | 0.278 | 3.3 | 110 |
| Rice | Hull | 3.1 | 0.28 | 0.75 | 25 |
|  | Straw | 8.5 | 0.30 | 2.1 | 68 |
| Nuts[b] | Hull & Shell | 4.3 | 0.29–0.35 | 1.2 | 39 |
| Flax | Waste | 1.4 | 0.30 | 0.4 | 14 |

[a]Walsh, M. et al. Corn Stover to Ethanol: Macro-economic Impacts Resulting from Industry Establishment. The 9th Biannual Bioenergy Conference, Buffalo, NY, Oct. 15–19, 2000. This study included only 10 states, and excluded corn acres classified as highly erosive. It assumed that 55% of the stover would be returned to the ground.
[b]Includes pecan and peanut shells, almond and walnut hulls and shells, and sunflower hulls. Fixed-C yield varies with nut type.

Accordingly, an object of the present invention is to provide a rapid, efficient and economical process for converting biomass into charcoal.

It is a further object of the present invention to reduce the required external heat input for converting biomass into charcoal.

It is a further object of the present invention to employ the pressurized hot gas effluent of the reactor to generate power via a steam or gas turbine, or a gas engine.

These and other objects and advantages to the present invention will be readily apparent upon reference to the drawing and the following description.

SUMMARY OF THE INVENTION

The present invention provides a low-energy input process for the pyrolytic conversion of biomass into charcoal or carbonized charcoal (collectively referred to as biocarbon) and power, comprising the steps of (i) sealing biomass into a container; (ii) pressurizing the container with air; (iii) heating the biomass to cause it to ignite and burn; (iv) releasing gas from the container during combustion and pyrolysis to maintain the pressure within the reactor below a predetermined value $P_{limit}$; (v) delivering additional air into the container, if needed, to achieve a temperature of about 400° C. or more throughout the bed of biomass material and while controlling pressure at a predetermined value $P_1$ by release of gas from the container; (vi) further releasing a portion of the gas from the container to lower the pressure of the container to a predetermined value $P_2$ lower than $P_1$. If necessary, the cycle of steps (v)–(vi) may be repeated one or more times at successively lower pressure levels as needed to convert the biomass to biocarbon. After the conversion is complete, the remaining gas is released from the container.

DESCRIPTION OF THE DRAWING

The accompanying FIGURE is a cross-section elevational view of a preferred apparatus for performing the process of the invention.

DESCRIPTION OF THE PREFERRED EMBODIMENT

The biomass material may be used without pretreatment, other than cutting wood to manageable sizes and shapes. Therefore, the material may have high or low moisture content. No special oven drying of the feedstock is necessary. A small amount of dry biomass, which can serve as tinder, may be loaded into the bottom of the reactor near the heater, prior to loading the moist biomass. This tinder can shorten the time and reduce the external energy input required to kindle the biomass.

Although air is the preferred gas oxidizer, mixtures of air with oxygen, or pure oxygen can be employed to speed ignition or reduce $P_{limit}$. Also, steps (ii) and (iii) may be interchanged. Air may be added to pressurize the reactor after the heater is turned on in order to speed ignition of the biomass.

The preferred apparatus for conducting the process of the invention comprises a vertical, cylindrical pressure vessel that serves as the reactor, a sealable door at one end (the top) thereof, a heating element within the reactor to ignite the biomass, a pressure regulator for regulating the pressure within the reactor, and a source of air at elevated pressure. To use the reactor a canister having a cavity to accommodate the heating element, is filled with biomass and placed in the reactor. After pressurization, ignition, starved-air combustion with the delivery of additional air as needed, pyrolysis, and pressure release, the canister of hot biocarbon is lifted out of the reactor and another canister of biomass is inserted into the reactor. The cylindrical reactor may also be positioned horizontally or obliquely. A vertical position is preferred for optimal air flow.

The typical turn-around time is less than 30 min, and the yield of charcoal ranges from about 30 wt % to 60 wt % depending upon its fixed-carbon content. The biocarbon made in accordance with the present invention typically has a volatile matter content of less than about 30 wt %, and a calorific value of about 13,000 BTU/lb.

The hot exhaust gas that leaves the reactor at elevated pressure and temperature may be delivered to a steam or gas turbine, or gas engine to generate power. Because the reactor operates in a cyclic mode, the production of gas is not steady. Consequently, it may be desirable to deliver the gas to an insulated, high pressure holding tank where it can be stored and delivered to the turbine or gas engine at a steady temperature and pressure. Alternatively, two or more reactors can be operated sequentially in such a way that their combined gas output is steady and suitable for delivery to a turbine or gas engine. If the hot pressurized gas is combustible, it may be burned in the gas turbine or a gas engine to generate additional power beyond that available from the mere expansion of a hot pressurized gas. Alternatively, the gas can be burned in a combustor, or flare, or a catalytic afterburner.

The process of the present invention will be described hereafter in conjunction with the apparatus shown in the accompanying figure. It will be realized, however, that other apparatus may be utilized by which the process parameters can be maintained and by which removal of the processed charcoal can be accomplished without exposure to air or oxygen.

Moist or dry biomass in any convenient form, such as wood logs or sawdust or rice hulls or corncobs, is loaded into the canister 14 by opening lid 15 at the proximal end (top) of the canister. The cavity 14A within the canister is preferably made from a metal screen or perforated metal to permit direct heating of the biomass or tinder and thereby to facilitate its ignition. After canister 14 is filled with biomass 13, it is loaded into reactor 10 via a hinged closure 12 and sealed. Insulation 11 lining the inside wall of the pressure vessel reduces loss of heat from the canister 14 during combustion and pyrolysis. Typically, the reactor 10 is first pressurized. An air compressor (not shown) delivers air to the reactor via line 1 through valve 18 to raise the internal pressure of the reactor to the desired level. Air or oxygen-enriched air may be used. Electric power is then delivered via wires 16A to rod heaters 16 to heat the packed bed of biomass material and to cause it to ignite and combust in the pressurized air environment. Tinder may be used at the bottom of canister 14 near the heaters to facilitate ignition. Air may be delivered to the reactor 10 during heating in order to speed ignition. Alternatively, biomass may be first heated to a sufficient ignition temperature, then the air can be added to attain the desired internal pressure. A pressure regulator 17 is utilized to release gas from the distal end (bottom) of the reactor 10 and thereby control pressure within the reactor 10. Temperatures within the reactor may be monitored by thermocouples 19. Likewise, the pressure within the reactor may be monitored by a pressure gauge 20. During the period of heating prior to ignition the pressure will rise due to the vaporization of moisture associated with the biomass. When ignition of the biomass occurs, the pressure and temperature within the reactor will rise more quickly. At this time, which is typically only two to four minutes after the heater is turned on, the heater may be turned off to minimize the input of external energy into the reactor. The pressure regulator 17 will be set to release gas from the reactor when the pressure reaches a designated limiting value, typically, at a pressure no greater than 400 psig. The optimum pressure depends upon the feedstock, but is often in the range of 100 to 200 psig. If needed, additional air may be delivered by the air compressor to the top of the canister via valve 18 and standpipe 29, and gases vented from the bottom of the reactor via valve 17 to achieve a temperature of 400° C. or more throughout the bed of material. This flow of gas from the proximal end to the distal end of the reactor causes it to operate in a downdraft mode, i.e., as air flows down through the bed the flame front moves upward. When the temperature of the proximal end of the bed reaches a desired level, which depends upon the biomass feedstock but is typically above 400° C., air delivery to the reactor is typically halted by closing valve 18. However, for some types of biomass it may be necessary to continue to add air at a lower pressure to sustain combustion. In most instances the amount of total air delivered into the container will be less than 2 kg per kg dry biomass. The time required for air delivery depends upon the airflow rate and the feedstock, but is typically in the range of 10 to 30 min. Gas within the reactor is released via regulator 17 and line 21 to reduce the pressure within the reactor. The pressure may be reduced to 0 psig, or to an intermediate predetermined level. If this gas is combustible, it may be burned in a flare as shown, or it may be burned in an external combustor (not shown) or a catalytic afterburner (not shown) to generate heat. Alternatively, the hot pressurized gases released from the reactor via regulator 17 can be delivered at elevated pressure to a standard steam turbine (not shown) or a gas engine (not shown) to generate power via expansion of the gas to atmospheric pressure. If the hot gas is combustible, it may be burned in a gas turbine (not shown) or a gas engine (not shown) to generate additional power.

The exact residence time of the material within the reactor will depend upon the particular type of material used and its moisture content, but typically the residence time will be less than 30 min. The optimum conditions for a particular biomass feedstock can be readily determined by anyone with ordinary skill in the art by testing samples of the particular biomass material.

It is a feature of the present invention that, to maximize efficiency, the reactor, between loads, need not be cooled. Gas is vented through valve 17 prior to opening the hinged closure 12 to reduce the pressure within the reactor to atmospheric pressure. Canister 14 is tight, thus minimizing entry of air into canister 14 so the hot biocarbon within the canister does not burn when the canister is lifted from the reactor. A small amount of air may enter the canister via cavity 14A, but if the canister is placed on a level surface or a pool of water, the outer edge of the bottom of the canister can effectively serve as a seal. After cooling, biocarbon is unloaded from the canister 14. Immediately after removing a canister from the reactor 10, another canister of biomass material may be lowered into the reactor. Thereafter the reactor may be sealed, pressurized, and heated again, without allowing any substantial cooling of the reactor 10, thereby making the overall process more efficient.

Referring to the FIGURE, other features of the reactor 10 include a proximal sealing gasket 22, a distal sealing gasket 23, inner sealing gasket 24, and distal blind flange 25. The hinged closure 12 is secured via a lock mechanism 26. The canister 14 accommodates a chain handle 28 for the purpose of raising and lowering it into reactor 10. Safety valve 30 employs a burst diaphragm to release gas in the event of overpressure.

The following examples are provided for the purpose of illustration and are not intended to limit the invention in any way.

EXAMPLE 1

Debarked, air-dry leucaena wood (1.437 kg with a moisture content of 14.3 wt % on a dry basis) was loaded into a reactor as shown in the FIGURE and pressurized to 400 psig with air. The internal heater was turned on. Prior to ignition some gas was vented from the bottom of the reactor to control its pressure at 400 psig. After 4 min of heating the wood ignited, the power to the heaters was turned off, and gas was vented from the bottom of the reactor to slowly reduce the pressure of gas in the reactor to 150 psig. Then a steady flow of air was delivered to the top of the reactor, and gas was vented from the bottom of the reactor to hold the pressure of the reactor at about 150 psig. Thirty four minutes after ignition the temperature of the top of packed bed of wood reached 600° C. and the airflow was turned off. Gas was vented from the bottom of the reactor to reduce the pressure of the reactor to 0 psig. About 0.2 kW-hr of power was needed to ignite the wood, and a total of 0.94 kg of air was delivered to the reactor after the initial pressurization. The contents of the reactor were subsequently removed and examined. All the leucaena had been converted to a high quality charcoal with average volatile matter content of 17.6 wt % and an ash content of 3.3 wt %. The charcoal yield was 36.8 wt % (dry basis) and the fixed carbon yield was 29.7 wt %. Based on the C, H, O composition of the leucaena wood feedstock, the theoretical yield of fixed-carbon is 34.4 wt %. Ref. 4. Thus the conditions enabled the conversion of leucaena wood into carbon with an efficiency of 86% of the theoretical limit.

EXAMPLE 2

This example is similar to Example 1, except that ignition occurs at a lower pressure. The reactor was loaded with 1.393 kg of air-dry (13.1 wt % on a dry basis) debarked leucaena wood and pressurized to 150 psig with air. The internal heater was turned on. Prior to ignition some gas was vented from the bottom of the reactor to control its pressure at 150 psig. After 6 min of heating the wood ignited and the power to the heaters was turned off. Then a steady flow of air was delivered to the top of the reactor, and gas was vented from the bottom of the reactor to hold the pressure of the reactor at about 150 psig. Twenty eight minutes after ignition the temperature of the top of packed bed of wood reached 560° C. and the airflow was turned off. Gas was vented from the bottom of the reactor to reduce the pressure of the reactor to 0 psig. About 0.2 kW-hr of power was needed to ignite the wood, and a total of 0.93 kg of air was delivered to the reactor after the initial pressurization. The contents of the reactor were subsequently removed and examined. All the leucaena had been converted to a high quality charcoal with average volatile matter content of 24.7 wt % and an ash content of 2.9 wt %. The charcoal yield was 40.0 wt % (dry basis) and the fixed carbon yield was 29.7 wt %. Like Example 1, the conditions of this experiment enabled the conversion of leucaena wood into carbon with an efficiency of 86% of the theoretical limit. These results demonstrate the reproducibility of the process, and show that higher ignition pressures have little influence on the performance of the process.

EXAMPLE 3

Oak wood waste from the manufacture of floorboards was obtained from a commercial manufacturer of charcoal. The reactor was loaded with 1.285 kg of air-dry (8.6 wt % on a dry basis) oak wood and pressurized to 200 psig with air. The internal heater was turned on. Prior to ignition some gas was vented from the bottom of the reactor to control its pressure at 200 psig. After 5 min of heating the wood ignited, the power to the heaters was turned off, and gas was vented from the bottom of the reactor to slowly reduce the pressure of gas in the reactor to 150 psig. Then a steady flow of air was delivered to the top of the reactor, and gas was vented from the bottom of the reactor to hold the pressure of the reactor at about 150 psig. Twenty five minutes after ignition the temperature of the top of the packed bed reached 460° C. and the airflow was turned off. Gas was vented from the bottom of the reactor to reduce the pressure of the reactor to 0 psig. About 0.2 kW-hr of power was needed to ignite the wood, and a total of 0.69 kg of air was delivered to the reactor after the initial pressurization. The contents of the reactor were subsequently removed and examined. All the oak wood had been converted to a high quality charcoal with average volatile matter content of 20.0 wt % and an ash content of 0.5 wt %. The charcoal yield was 35.1 wt % (dry basis) and the fixed carbon yield was 28.0 wt %. Based on the C, H, O composition of the oak wood feedstock, the theoretical yield of fixed-carbon is 29.6 wt %.[4] Thus the conditions enabled the conversion of oak wood into carbon with an efficiency of 95% of the theoretical limit.

EXAMPLE 4

The reactor was loaded with 0.496 kg of air-dry (13.5 wt % on a dry basis) corn cobs and pressurized to 150 psig with air. The internal heater was turned on. During the heatup period some gas was vented from the top of the reactor to control its pressure at 150 psig. After 2 min of heating the cob fuel ignited. Shortly thereafter a steady flow of air at 150 psig was delivered to the top of the reactor, and gas was vented from the bottom of the reactor to hold the pressure of the reactor at about 150 psig. Eighteen minutes after ignition the flow of air was turned off and gas was vented from the bottom of the reactor to reduce the pressure of the reactor to 0 psig. A total of 0.51 kg of air was delivered to the reactor after the initial pressurization. The contents of the reactor were subsequently removed and examined. All the cobs had been converted to a high quality charcoal with average volatile matter content of 13.6 wt % and an ash content of 2.7 wt %. The charcoal yield was 33.1 wt % (dry basis) and the fixed carbon yield was 28.0 wt %. Based on the C, H, O composition of the corncob feedstock, the theoretical yield of fixed-carbon is 28 wt %. Ref. 4. Thus the conditions enabled the conversion of corncob into carbon with an efficiency of 100% of the theoretical limit.

Comparative Example 5

In Example 2 0.492 kg of charcoal (dry weight) was produced from 1.231 kg leucaena wood (dry weight) with an input of 0.2 kW-hr to ignite the wood. In this example the power consumption was about 0.4 kW-hr per kg of charcoal produced. In Table 3 of U.S. Pat. No. 5,435,983 the power consumed was 3.5 to 3.7 kWh per kg of charcoal produced from air-dry leucaena wood. This comparison shows that the present invention reduces the power consumption by almost a factor of ten. An even larger reduction in power consumption can be realized with the present invention when a larger reactor is employed, since 0.2 kWh is sufficient to ignite a much larger amount of biomass in a larger reactor, resulting in the production of a much larger quantity of charcoal. A comparison of the heating period shows a reduction from about 110 min (Table 3 in U.S. Pat. No. 5,435,983) to 34 min in Example 2. Note that the charcoal yield in Runs A and B of Table 3 are nearly identical to those realized in Example 2.

Comparative Example 6

In Example 4 the charcoal and fixed-carbon yields from corncob were 33.1 and 28.0 wt % (respectively). When the process of U.S. Pat. No. 5,435,983 was employed with moist corncob in the same laboratory reactor as used in Example 2, the charcoal and fixed-carbon yields were 31.2 and 21.6 wt % (respectively). Ref. 4. Thus the present invention increases the fixed-carbon yield from corncob by 30%.

These comparative examples show that the present invention dramatically reduces the power consumption and time required to carbonize biomass relative to our earlier work, with the added benefit of an increase in the fixed-carbon yield.

The invention may be embodied in other specific forms without departing from the spirit or essential characteristics thereof. The present embodiments are therefore to be considered in all respects as illustrative and not restrictive of the scope of the invention. The invention is indicated by the appended claims, and all modifications that come within the meaning and range and equivalency of the claims are therefore intended to be embraced therein.

References Cited (1) Antal, M. J.; Varhegyi, G. Cellulose Pyrolysis Kinetics: The Current State of Knowledge. Ind. Eng. Chem. Res. 1995, 34, 703.
(2) Antal, M. J., Jr.; Varhegyi, G.; Jakab, E. Cellulose Pyrolysis Kinetics: Re-visited. Ind. Eng. Chem. Res. 1998, 37, 1267.
(3) Smith, K. R.; Pennise, D. M.; Khummongkol, P.; Chaiwong, V.; Ritgeen, K.; Zhang, J.; Panyathanya, W.; Rasmussen, R. A.; Khalil, M. A. K. Greenhouse Gases from Small-Scale Combustion Devices in Developing Countries: Charcoal-Making Kilns in Thailand. EPA-600/R-99-109, Office of Air and Radiation and Policy and Program Evaluation Div.: Washington, D.C., 1999.
(4) Antal, M. J.; Allen, S. G.; Dai, X.; Shimizu, B.; Tam, M. S.; Gronli, M. G. Attainment of the theoretical yield of carbon from biomass. Ind. Eng. Chem. Res. 2000, 39, 4024.
(5) Antal, M. J.; Croiset, E.; Dai, X. F.; DeAlmeida, C.; Mok, W. S. L.; Norberg, N.; Richard, J. R.; Majthoub, M. A. High-Yield Biomass Charcoal. Energy Fuels 1996, 10, 652.

It is claimed:

1. A process for the conversion of biomass material into charcoal or carbonized charcoal, comprising the steps of:
    (a) sealing said material in an enclosed container having a proximal end and a distal end whereby the non-inert contents of said container consist of said material and air;
    (b) pressurizing said container with air;
    (c) heating said material to cause it to ignite and burn;
    (d) controlling the pressure within said container at value $P_1$, so that it does not exceed a limit pressure value $P_{limit}$, by releasing gas from said container;
    (e) optionally delivering additional air into said container to attain a temperature of above about 400° C. throughout said material while controlling said pressure at $P_1$;
    (f) and releasing gas from said container to lower said pressure to pressure value $P_2$.

2. A process according to claim 1 wherein said steps (b) and (c) are performed in reverse order.

3. A process according to claim 1 wherein in step (e) said air is delivered to the proximal end of said container, and said pressure is controlled at pressure $P_1$ below $P_{limit}$ by releasing said gas from the distal end of said container.

4. A process according to claim 1 wherein in said step (c) said material is heated from said distal end.

5. A process according to claim 3 wherein subsequent to step (f) additional air continues to be delivered to the proximal end of said container at said pressure $P_2$ to sustain combustion for a period of time.

6. A process according to claim 1 wherein the optional delivery of additional air in step (e) and the decrease in pressure by the controlled release of said gas to a lower pressure level in step (f) are repeated two or more times to successively lower pressures to completely carbonize the biomass material.

7. A process according to claim 6 wherein said gas is released from the distal end of said container.

8. A process according to claim 1 wherein tinder is sealed within said container to facilitate ignition of said biomass material.

9. A process according to claim 1 wherein in step (c) heating is ceased after said biomass material ignites.

10. A process according to claim 1 wherein said gas released from said container is externally recovered and burned in an external combustor.

11. A process according to claim 1 wherein said gas released from said container is delivered at elevated temperature and pressure to a catalytic afterburner.

12. A process according to claim 1 wherein said gas released from said container is delivered at elevated temperature and pressure to a steam or gas turbine or gas engine to generate power.

13. A process according to any of claims 1 through 12 further comprising the steps of (g) halting any delivery of air into said container; (h) reducing said pressure to atmospheric pressure by the release of gas from said container, and (i) removing the hot charcoal or carbonized charcoal without its exposure to sufficient air or oxygen to cause combustion thereof.

14. A process according to claim 1 wherein said biomass material is moist.

15. A process according to claim 1 wherein said biomass material is dry.

16. A process according to claim 1 wherein $P_{limit}$ is about 400 psig.

17. A process according to claim 1 wherein the amount of additional air delivered into the container is less than about 2 kg per kg of dry biomass feed loaded.

18. A process according to claim 1 wherein the pressure is controlled below $P_{limit}$ by sequentially releasing gas from the proximal end of said container, and then releasing gas from the distal end of said container.

19. A process according to claim 1 wherein said container is vertically positioned so that said proximal end is at the top and said distal end is at the bottom.

20. A process according to claim 1 wherein said container is horizontally positioned so that said proximal end and said distal end are horizontally opposed on said container.

21. A process according to claim 1 wherein prior to step (f), delivery of additional air into said container is halted and the value of $P_2$ is atmospheric pressure.

* * * * *